United States Patent Office 3,598,751
Patented Aug. 10, 1971

3,598,751
PROCESS FOR PREPARING BIVALENT METAL HALOPHOSPHATE COMPOUNDS AND PRODUCTS OBTAINED THEREBY
Daniel J. Frese, Webster Groves, and Ronald S. Schreiber and Hugh C. Bertsch, St. Louis, Mo., assignors to Mallinckrodt Chemical Works, St. Louis, Mo.
No Drawing. Continuation of application Ser. No. 610,772, Jan. 23, 1967. This application Feb. 9, 1970, Ser. No. 9,103
Int. Cl. C09k 1/36
U.S. Cl. 252—301.4P                     5 Claims

ABSTRACT OF THE DISCLOSURE

Activated bivalent metal halophosphate compounds having the apatite crystal structure are prepared by coprecipitation. Two or more total solutions, the sum of which contain all the ions needed in the final product, are mixed in approximtaely stoichiometric proportions. A brief firing converts this intermediate into a halophosphate phosphor of the apatite type.

CROSS-REFERENCE TO RELATED APPLICATION

This application is a continuation of application Ser. No. 610,772, filed Jan. 23, 1967 and now abandoned.

BACKGROUND OF THE INVENTION

The present invention relates to the field of inorganic chemistry, and more particularly to processes of preparing activated bivalent metal halophosphates by precipitation. The invention also relates to the intermediate products obtained by these processes and to apatite-type halophosphate phosphors obtainable therefrom.

It is well known that activated halophosphates of bivalent metals are widely used as the luminescent coating material in the familiar fluorescent electric lamps used in many homes, commercial and industrial lighting applications. The nature and composition of such halophosphate phosphors are adequately described in the patent and journal literature. Representative of these is the disclosure of A. H. McKeag and P. W. Ranby in U.S. Pat. 2,488,733, issued Nov. 22, 1949. As indicated therein, these halophosphate phosphors are more or less analogous to the naturally occurring mineral, apatite.

Many embodiments of apatite-type halophosphate phosphors are known. These consist basically of a matrix containing various supplementary modifier and activator ions, usually in minor amounts. One of the most widely employed basic matrices is a calcium fluorophosphate represented by the formula $3Ca_3(PO_4)_2 \cdot CaF_2$. This formula corresponds to that of natural apatite. The inclusion of a small proportion of trivalent antimony ions in the crystal lattice of the apatite matrix provides a phosphor that is excited by ultraviolet radiation of 2537 A. wavelength to fluoresce with the emission of a pale blue light. By modifying this basic antimony-activated calcium fluorophosphate phosphor one may bring about qualitative and quantitative changes in the character of the light emitted by the phosphor. It is well known, for example, that manganese is a desirable secondary or supplementary activator. Similarly, it is known that the substitution of strontium and/or cadmium for a portion of the calcium and of chloride for a portion of the fluoride in the basic matrix modifies the characteristics of the phosphor in a manner that may be desirable for certain purposes. The effects of such variations are discused, for example, by McKeag and Ranby, referred to above, by G. R. Gilooly et al., U.S. Pat. 3,109,819 (Nov. 5, 1963) and M. A. Aia et al., U.S Pat. 2,965,786 (Dec. 20, 1960).

Gilooly et al. further emphasize the importance of precise control of composition and the difficulties of achieving such precise control in the preparation of phosphors by the conventional method.

Although such phosphors have been produced commercially in large volume for nearly twenty years, the method of production is still basically that disclosed by McKeag and Ranby. Suitable highly purified and finely powdered source compounds are mixed thoroughly and the mixture is fired at a high temperature for an extended period to bring about vapor-solid and/or solid state reactions among the ingredients, with the formation of a crystalline product having the apatite structure. Typically, a mixture of calcium monohydrogen phosphate ($CaHPO_4$), strontium monohydrogen phosphate ($SrHPO_4$), calcium chloride and/or calcium fluoride, antimony trioxide, ammonium chloride and manganese phosphate or manganese carbonate is ball-milled to achieve intimate mixing and the mixture is fired at 1050–1200° C. for two or more hours. It is of considerable importance that the particle size of the phosphor product be controlled. This must be achieved principally by precise control of the firing conditions and of the particle size of the initial ingredients since size reduction of the phosphor particles after firing substantially reduces the light output of the phosphor.

For some time it has been suspected by those skilled in the phosphor art that the microstructure of halophosphate phosphors prepared by the conventional dry-firing process was non-uniform. Additional evidence tending to confirm this view was recently disclosed by A. Wachtel (Journal of the Electrochemical Society, February 1966, pp. 128–134), who demonstrated the existence of a substantial concentration gradient of manganese, and especially antimony, between the outer layer and the core of calcium halophosphate phosphor particles into which manganese and antimony ions had been incorporated by firing for periods of up to 72 hours. Such non-uniformity is believed to be an important defect in phosphors prepared by conventional methods, since the presence of core portions deficient in the requisite activators, for example, reduces the light output that might otherwise be achieved. Wachtel's study also supports this view.

Some attempts have been made at using wet methods in the preparation of halophosphate phosphors, but these have not avoided the fundamental weakness of the conventional method, i.e., the necessity for a high temperature solid state diffusion-controlled process. Such approaches are described, for example, in British patent specification 614,700 (Dec. 20, 1948) and Netherlands Pat. 83,992 (Dec. 16, 1956).

SUMMARY OF THE INVENTION

Among the objects of the present invention may be mentioned the provision of novel bivalent metal halophosphate compounds, the provision of methods of preparing compounds of the type indicated, and the provision of improved halophosphate phosphors of substantially homogeneous microstructure. Other objects and features will be in part apparent and in part pointed out hereinafter.

The present invention is directed to processes for preparing an apatite-type fluorescent composition by coprecipitation which comprise mixing at least two aqueous reactant solutions the summation of which contain phosphate, fluoride and activator ions and bivalent metal ions known to be useful in forming the matrix of a halo-phosphate phosphor, said reactant solutions being substantially free of undissolved matter.

In addition to the process described above, the invention also includes the novel immediate product of the process outlined above, which may be described as an unfired coprecipitated apatite-type fluorescent composition of substantially homogeneous microstructure consisting essentially of a bivalent metal matrix containing uniformly distributed activator ions.

The novel apatite-type phosphors of substantially homogeneous microstructure obtainable by a brief firing step from the compositions defined above are also an aspect of the invention.

DESCRIPTION OF THE PREFERRED EMBODIMENTS

In contradistinction to prior art processes, the process of the present invention utilizes reactant solutions in which all of the ions desired in the ultimate phosphor lattice are in solution. This is accomplished by keeping chemically incompatible ions, that is, ions which interreact to form water-insoluble compounds, in separate solutions until the moment they are mixed to produce, by coprecipitation, a product having the apatite structure which contains all the desired ions in essentially the desired proportions in the crystal structure. The presence of the apatite structure is indicated, not only by X-ray diffraction studies, but also by the fact that the dried but unfired precipitate will fluoresce under U.V. irradiation.

Firing brings about full development of fluorescent capacity by increasing the crystallite size and "smoothing out" lattice defects. This is accomplished by a relatively brief firing period, as contrasted with the extended firing required in conventional processes to induce solid state reactions and diffusion of ions into the crystal lattice. It will be understood that the firing period will vary depending upon the quantity of material being fired, but in each instance, the period will be relatively brief compared with the firing periods required heretofore. Firing may be carried out in an atmosphere of nitrogen or other inert gas, as well as in air.

Because of the diverse chemical nature of the various ions present, at least one of the reactant solutions will normally be somewhat acid and a second will be somewhat alkaline. This may be necessary to forestall hydrolytic precipitation or otherwise to insure complete and stable solution of the solutes present.

Preferably, the acidity/alkalinity of the precipitation mixture is maintained approximately within the range of pH 6–8. However, a wider variation within the range of approximately pH 5–9 is often acceptable. Higher levels of acidity or alkalinity may be acceptable in specific situations but are ordinarily to be avoided. Control of pH may be provided by adjustment of the acidity/alkalinity of one or more of the reactant solutions or by the simultaneous controlled addition of acidic and/or basic solutions as separate process streams.

Obviously, the reactant solutions should not contain ions that are deleterious to apatite-type phosphors. For the present purposes, such ions are considered to be those whose presence in an apatite-type phosphor may be expected to affect the performance of the phosphor adversely and which would not be reduced to innocuous levels in the fired phosphor in the normal course of the processing, as by washing or leaching in the wet phase of the process or by volatilization in the firing phase.

The process of the invention involves a true coprecipitation with the formation of an essentially uniform product, as distinguished from a stepwise precipitation, which may result in a substantial disparity in composition between the precipitate formed at the beginning of the precipitation step and that formed near the end.

The precipitation may be carried out over a wide range of temperatures. In most cases the precipitates obtained at or near normal room temperature consist of extremely small crystallites. Filtration and washing of these products is slow, and the product normally dries in the form of extremely hard lumps. Precipitations made at elevated temperatures (60–90° C.) normally result in the formation of extremely uniform granular precipitates, which are more easily filtered and washed. Such products normally dry to a soft, friable cake.

If the presence of chloride in the phosphor is desired, it may be included as hydrochloric acid or as a suitable chloride salt in one of the reactant solutions.

Some beneficial effects may be obtained by digesting the precipitate. The digestion may be carried out by resuspending the precipitate in distilled water, and heating the slurry for several hours. Optionally, if it is determined that additional chloride is desired in the lattice, the chloride content may be increased by including chloride ions in the digestion medium.

The amount of chloride ion present in the ultimate product is influenced by several factors. These include the characteristics of the reactant solutions and of the precipitation mixture—pH, concentration, stoichiometry, and the absence or presence and concentration of an added chloride. Similarly, the digestion condition—time, temperature profile, chloride concentration, and composition of the precipitate affect the amount of chloride introduced. The proper conditions to achieve a particular result must be determined empirically.

The chloride content of the fired phosphor is further affected by the firing technique and conditions used.

As compared with conventional methods of producing halophosphate phosphors, the process of the present invention has several advantages. For example, the novel intermediate halophosphate may be converted to an apatite-type phosphor in a much shorter firing time than the conventional physical mixture of solid phases. Moreover, the present method avoids the necessity of mass transport of fairly heavy or volatile atomic species by solid state diffusion. Furthermore, it provides simpler and more precise control of homogeneity, composition and particle size and shape than conventional methods.

The following examples illustrate the invention.

PROCEDURE I

Examples 1–4

MAKE-UP

Solution A (cation solution).—A clear solution of calcium chloride, antimony trichloride and strontium or cadmium chloride was prepared by dissolving calcium chloride, antimony trioxide, and strontium or cadmium carbonate in dilute hydrochloridic acid, adding manganous nitrate solution and diluting with water to a predetermined volume.

Solution B (anion solution).—Ammonium hydrogen phosphate and ammonium fluoride were dissolved in dilute ammonia solution and the solution was diluted with water to a predetermined volume.

Details are set forth in Table 1.

PRECIPITATION

Solutions A and B were simultaneously metered slowly, at equivalent rates, into a precipitation vessel containing a measured volume of water, well stirred. As a result, the pH of the precipitation slurry was stabilized within a reasonably narrow range. Following completion of the additions the slurry was stirred for an additional period after which it was filtered and the filter cake was washed thoroughly.

DIGESTION AND DRYING

The washed precipitate (filter cake) was resuspended in water. In some cases the cake was divided into two or three portions and hydrochloric acid or ammonium chloride was included in the aqueous medium. In most cases the slurry was heated to a temperature of 70–95° C. and allowed to stand several hours before filtration. The resulting filter cake was washed with water, dried at 125° C. and ground. Details are set forth in Table 2.

TABLE 1.—COMPONENTS USED IN MAKING UP SOLUTIONS A (CATION SOLUTION) AND B (ANION SOLUTION)— EXAMPLES 1-4

| Components | Example No. | | | |
|---|---|---|---|---|
| | 1 | 2 | 3 | 4 |
| Solution A: | | | | |
| $CaCl_2 \cdot 2H_2O$ (g.) | 912.9 | 912.9 | 929.9 | 456.5 |
| $Sb_2O_3$ (g.) | 8.20 | 8.20 | 8.20 | 4.51 |
| $SrCO_3$ (g.) | 24.91 | 24.91 | | 6.23 |
| $CdCO_3$ (g.) | | | 8.64 | 7.27 |
| $Mn(NO_3)_2$ (g.) | 33.55 | 33.55 | 33.55 | 18.45 |
| HCl (moles) | 1.2 | 1.2 | 0.98 | 0.65 |
| Total volume (l.) | 4 | 4 | 4 | 2 |
| Solution B: | | | | |
| $(NH_4)_2HPO_4$ (g.) | 563.1 | 563.1 | 613.0 | 286.5 |
| $NH_4F$ (g.) | 36.71 | 44.75 | 36.70 | 20.13 |
| $NH_4OH$ (moles) | 4.80 | 4.70 | 3.95 | 2.34 |
| Total volume (l.) | 4 | 4 | 4 | 4 |

TABLE 2.—PRECIPITATION AND DIGESTION CONDITIONS—EXAMPLES 1-4

| Condition | Example No. | | | |
|---|---|---|---|---|
| | 1 | 2 | 3 | 4 |
| Precipitation: | | | | |
| Solution A: | | | | |
| Initial temperature (° C.) | Rm. temp. | 29 | 28 | Rm. temp. |
| pH | 0.13 | 0.06 | 0.22 | 0.32. |
| Solution B: | | | | |
| Initial temperature (° C.) | Rm. temp. | 31 | 28 | Rm. temp. |
| pH | 9.9 | 9.60 | 9.47 | 9.40. |
| Precipitation slurry: | | | | |
| Initial volume of water (l.) | 2 | 2 | 2 | 1. |
| Elapsed time for pptn. (min.) | 24 | 23 | 27 | 28. |
| pH range during pptn. | 7.0 to 7.52 | 7.0 to 7.6 | 6.1 to 6.8 | 7.0 to 8.8. |
| pH at end of pptn. | 7.52 | 7.18 | 6.5 | 7.45. |
| Time stirred after pptn. (min.) | 30 | 30 | 15 | 15. |
| Digestion: | | | | |
| Portion X: | | | | |
| Total volume of slurry (l.) | 2 | 3 | 3.5 | 1.3. |
| Added solute | None | None | None | None. |
| Initial temperature (° C.) | Rm. temp. | 35 | 28 | Abt. 26. |
| Max. temperature (° C.) | 90 | 90 | 70 | Abt. 26. |
| Time elapsed during heating (min.) | 50 | 50 | 40 to 50 | No heating. |
| Time elasped between heating and filtration. | 16 hrs | 21 hrs | 17 hrs | 17 hrs. |
| Portion Y: | | | | |
| Total volume of slurry (l.) | 2 | 3 | (*) | 1.3. |
| Added solute | 0.12 mol. HCl | 0.12 mol. HCl | | None. |
| Initial temperature (° C.) | Rm. temp. | 29.5 | | Abt. 26. |
| Max. temperature (° C.) | 90 | 93 | | 70. |
| Heating time | | 35 min | | 25 min. |
| Time between heating and filtration | Abt. 16 hrs | Abt. 22 hrs | | Abt. 17 hrs. |
| Portion Z: | | | | |
| Total volume of slurry (l.) | 2 | 3 | | |
| Added solute | $NH_4Cl$, 100 g. | $NH_4Cl$, 100 g. | | |
| Initial temperature (° C.) | Rm. temp. | 31 | | No digestion. |
| Max. temperature (° C.) | 90 | 90 | | |
| Heating time | | 60 min | | |
| Time between heating and filtration | 16 hrs | 23 hrs | | |

* Filter cake divided into two portions, each of which was digested as indicated under Portion X. The two were then combined for filtration and further treatment.

PROCEDURE II

Example 5

Antimony trioxide ($Sb_2O_3$, 2.25 g.) and strontium carbonate ($SrCO_3$, 6.23 g.) were dissolved in 600 ml. of an aqueous solution containing calcium chloride ($CaCl_2$, 172.3 g.) and hydrochloric acid (24.5 ml. of approx. 37% HCl). Manganese nitrate solution [9.23 g. of $Mn(NO_3)_2$] was added and the composite solution was diluted to 1000 ml. (Solution A).

Diammonium hydrogen phosphate [$(NH_4)_2HPO_4$, 143.2 g.] and ammonium fluoride ($NH_4F$, 11.17 g.) were dissolved in sufficient water to make a total volume of 3000 ml. (Solution B).

Ammonium hydroxide (100 ml. of approx. 30% $NH_3$ solution) was diluted to a volume of 1000 ml. (Solution C).

Solutions A and C were added slowly with stirring to Solution B (initial pH 7.80) during a period of about one hour, the pH of the precipitation mixture remaining within the range 7.8–8.25. A few minutes after completion of the mixing the slurry was filtered and the cake was washed and dried at 125° C.

The dried product was ground to pass a 140 mesh screen and a portion was fired at 1050° C. for 15 minutes (weight loss, 5.86%).

PROCEDURE III

Example 6

Antimony trioxide ($Sb_2O_3$, 2.25 g.) was dissolved in 48% hydrofluoric acid (2.10 g.) and the solution was diluted to 1000 ml. (Solution A).

A solution containing diammonium hydrogen phosphate [$(NH_4)_2HPO_4$, 143.2 g.], ammonium fluoride ($NH_4F$, 11.17 g.) and ammonium hydroxide (40 ml. of approx. 30% $NH_3$ solution) was prepared and diluted to 1000 ml. (Solution B).

Strontium carbonate ($SrCO_3$, 6.23 g.) was dissolved in a solution containing hydrochloric acid (8 ml. of approx. 37% HCl) and calcium chloride ($CaCl_2$, 172.3 g.). Manganese nitrate solution [9.23 g. of $Mn(NO_3)_2$] was added. The composite solution was diluted to 2000 ml., hydroxylamine hydrochloride (5 g.) was dissolved therein and 30% $NH_3$ solution (7 ml.) was added (final pH, 8.5) (Solution C).

Solution C was heated to 60° C., and Solutions A and B were added simultaneously during a period of 50–55 minutes. The temperature of the precipitation mixture was maintained at 60° C. and 30% $NH_3$ solution was added in small portions at intervals during the precipitation (final pH, 5.6).

A few minutes after completion of the precipitation the slurry was filtered and the cake was washed and dried at 125° C.

PROCEDURE IV

Example 7

Antimony trioxide ($Sb_2O_3$, 2.25 g.) and strontium carbonate ($SrCO_3$, 623 g.) were dissolved in a solution containing hydrochloric acid (24.5 ml. of approx. 37% HCl) and calcium chloride ($CaCl_2$, 172.3 g.). Manganese nitrate solution [9.23 g. of $Mn(NO_3)_2$] was added and the composite solution was diluted to 1000 ml. (Solution A).

Diammonium hydrogen phosphate [$(NH_4)_2HPO_4$, 143.2 g.] and ammonium fluoride ($NH_4F$, 11.17 g.) were dissolved in water and the solution was diluted to 2000 ml. (Solution B).

Ammonium hydroxide (73 ml. of approx. 30% $NH_3$ solution) was diluted to 1000 ml. (Solution C).

At room temperature, Solutions A and B were added at equivalent rates, with stirring, to Solution C during a period of 75 minutes. The final pH of the precipitation slurry was 5.3.

The slurry was filtered and the cake was washed and dried at 125° C.

Example 8

The dried products of Examples 1–7 were ground to pass a 140 mesh screen and small portions were fired at 1050–1150° C. for about 15 minutes.

Chemical analyses of certain of the unfired products of Examples 1–7 and of certain of the fired products of Example 8 are set forth in Table 3. The fired products are identified by the letter F following the appropriate example numbers of the unfired intermediates.

TABLE 3.—CHEMICAL COMPOSITION OF UNFIRED AND FIRED APATITE-TYPE HALOPHOSPHATES (EXPRESSED IN TERMS OF ATOMIC/IONIC PROPORTIONS OF HALIDE AND METAL IONS/6 MOLES ($PO_4$))

| Example No. | Ca | Sr | Cd | Mn | Sb | Cl | F | Mols. $PO_4$ | Wt. loss on firing (percent) |
|---|---|---|---|---|---|---|---|---|---|
| 1X | 8.68 | 0.24 | | 0.25 | 0.077 | 0.46 | 1.35 | 6.00 | 8.0 |
| 1Y | 8.67 | 0.23 | | 0.25 | 0.081 | 0.50 | 1.37 | 6.00 | 8.5 |
| 1Z | 8.68 | 0.25 | | 0.24 | 0.072 | 1.97 | 1.36 | 6.00 | 15.5 |
| 2X | | | | | | | | | 5.5 |
| 2Y | | | | | | | | | 6.0 |
| 2Z | | | | | | | | | 9.5 |
| 3 | 8.56 | | 0.39 | 0.25 | 0.073 | 0.15 | 1.32 | 6.00 | 4.5 |
| 5 | 8.73 | 0.26 | | 0.28 | 0.084 | 0.060 | 1.44 | 6.00 | 5.86 |
| 6 | 8.98 | 0.25 | | 0.29 | 0.070 | 0.00 | 1.66 | 6.00 | 3.94 |
| 7 | | | | | | | | | 9.00 |
| 1XF | 8.77 | 0.23 | | 0.25 | 0.069 | 0.18 | 1.31 | 6.00 | |
| 1YF | 8.69 | 0.24 | | 0.25 | 0.063 | 0.15 | 1.32 | 6.00 | |
| 1ZF | 8.68 | 0.23 | | 0.25 | 0.031 | 0.24 | 1.27 | 6.00 | |
| 2XF | 8.83 | 0.25 | | 0.25 | 0.071 | 0.033 | 1.61 | 6.00 | |
| 2YF | 8.86 | 0.23 | | 0.25 | 0.067 | 0.019 | 1.59 | 6.00 | |
| 2ZF | 8.82 | 0.25 | | 0.25 | 0.057 | 0.056 | 1.59 | 6.00 | |
| 3F | 8.75 | | 0.054 | 0.25 | 0.068 | 0.10 | 1.27 | 6.00 | |
| 4ZF | 8.45 | 0.11 | 0.11 | 0.29 | 0.080 | 0.061 | 1.34 | 6.00 | |

The dried, unfired products of Examples 1–7 were irradiated by short wave length U.V. light (2537 A.) from a mercury vapor lamp. Each fluoresced distinctly under such irradiation.

The crystal structure of the unfired products was examined by X-ray diffraction. The diffraction pattern of each contained lines characteristic of the apatite crystal structure, the breadths of the lines indicating that the crystallites were very small.

A semi-quantitative comparison of the luminous output of the halophosphate phosphors of Example 8 under 2537 A. irradiation with that of a commercial "warm white" phosphor was obtained by means of the Spectra Brightness Spot Meter (Photo Research Corp., Hollywood, Calif.). This is a filter photometer whose response to "white" light may be adjusted to approximate that of the human eye. Such photometer readings are shown in Column A of Table 4. The readings shown in Columns B and C of Table 4 are readings made, respectively, with red and blue filters, indicating the relative intensities of the red and blue components of the light emitted by the phosphors. Higher readings indicate higher luminous output.

The X-ray diffraction patterns of the fired products correspond to that of well crystallized calcium fluoroapatite (ASTM pattern 15–876). Expected small deviations in the unit cell dimensions are observed, the deviations being due to substitution by the various cation or anion additives in the crystal lattice. Also, in some cases small proportions of secondary phases, such as $Ca_2P_2O_7$, are indicated.

TABLE 4

| | Relative brightness | | |
|---|---|---|---|
| Phosphor | A (Eye-response filter) | B (Red filter) | C (Blue filter) |
| 1XF | 72 | 51 | 25 |
| 1YF | 74 | 51 | 26 |
| 1ZF | 55 | 39 | 21 |
| 2XF | 75 | 48 | 24 |
| 2YF | 79 | 49 | 24 |
| 2ZF | 81 | 53 | 26 |
| 3F | 81 | 55 | 27 |
| 4XF | 67 | 41 | 24 |
| 4YF | 65 | 39 | 25 |
| 4ZF | 84 | 56 | 23 |
| 5F | 85 | 54 | 24 |
| 6F | 51 | 31 | 15 |
| 7F | 77 | 50 | 24 |
| Commercial warm white | 78 | 56 | 21 |

What is claimed is:

1. A process for precipitating a luminescent alkaline earth fluochloroapatite which comprises simultaneously adding a first reactant solution having dissolved therein alkaline earth ions, chloride ions and activator ions selected from the group consisting of antimony ions and manganese ions and a second reactant solution having dissolved therein phosphate and fluoride ions to a stirred precipitation medium containing water, said reactant solutions being substantially free of undissolved matter and being added in approximately stoichiometric proportions.

2. A process as defined by claim 1 wherein said first reactant solution contains calcium chloride and said second reactant solutions contains diammonium hydrogen phosphate and ammonium fluoride.

3. A process as defined by claim 2 wherein additional chloride ions are present in said second reactant solution or said precipitation medium.

4. A process as defined by claim 1 wherein the activator ions dissolved in said first reactant solution are antimony ions.

5. A process as defined by claim 1 wherein the pH of said precipitation medium is maintained within the range of approximately 6–8 upon addition of said first and second reactant solutions.

References Cited

UNITED STATES PATENTS 3,242,369   3/1966   King et al. _____ 252—301.4P

FOREIGN PATENTS 717,653   10/1954   Great Britain ____ 252—301.4P

ROBERT D. EDMONDS, Primary Examiner